United States Patent [19]

Khachaturian

[11] 4,144,215

[45] Mar. 13, 1979

[54] BINDERS FOR FOUNDRY MIXES COMPRISING POLYISOCYANATE AND STYRENE-ALLYL ALCOHOL COPOLYMER OR ALKYLENE OXIDE DERIVATIVE THEREOF

[75] Inventor: Arek Khachaturian, Birmingham, Mich.

[73] Assignee: International Minerals & Chemical Corp., Libertyville, Ill.

[21] Appl. No.: 917,700

[22] Filed: Jun. 21, 1978

[51] Int. Cl.² ............................ C08K 5/06; C08K 5/10
[52] U.S. Cl. ................................. 260/31.2 N; 164/43; 260/33.2 R; 260/37 N; 260/859 R; 528/75
[58] Field of Search ........ 528/75; 260/859 R, 31.2 R, 260/31.2 N, 37 N, DIG. 40, 33.2 R; 164/43

[56] References Cited

U.S. PATENT DOCUMENTS

| | | | |
|---|---|---|---|
| 3,403,721 | 10/1968 | Robins et al. | 164/43 |
| 3,428,110 | 2/1969 | Walker et al. | 164/43 |
| 3,925,320 | 12/1975 | Morgan | 260/874 X |
| 3,969,569 | 7/1976 | Vasta | 260/859 R X |

Primary Examiner—Sandra M. Person
Attorney, Agent, or Firm—Robert H. Dewey; Howard E. Post

[57] ABSTRACT

A foundry core composition comprising a foundry aggregate, a resin base such as styrene-allyl alcohol copolymer or alkylene oxide derivative thereof, a polyisocyanate, and a catalyst therefor; the compositions being suitable for use in cold box, no-bake, and rapid no-bake processes.

13 Claims, No Drawings

BINDERS FOR FOUNDRY MIXES COMPRISING POLYISOCYANATE AND STYRENE-ALLYL ALCOHOL COPOLYMER OR ALKYLENE OXIDE DERIVATIVE THEREOF

BACKGROUND OF THE INVENTION

This invention relates to an improved foundry core mix. In a more particular aspect, this invention relates to components of an improved core binder system.

Cores useful in making metal castings are customarily made by placing a foundry aggregate, usually silica sand which has been admixed with a suitable binder, against a shape or pattern and then hardening the binder, as by polymerization. The resulting core is a self-supporting structure which forms a part of a mold assembly.

The cores are made by a variety of processes employing a wide variety of binders. Three well-known processes are the so-called cold box process, no-bake process and the rapid no-bake process. In the cold box process, sand is mixed with a suitable resinous binder composition, blown into a core box, and then gassed with a suitable vapor phase catalyst to cure the binder. By such process, which is described for example in U.S. Pat. No. 3,409,597, a core of sufficient hardness to be stripped from the core box is produced in a matter of seconds.

In the no-bake process, a resinous core binder is mixed with a catalyst and sand and placed in a core box. The core cures at ambient temperatures but much more slowly than in the cold box process, e.g. a period of hours or even days. After a suitable period of time, e.g. two hours, the core can be stripped from the core box, but requires further cure time.

In the rapid no-bake process, which is similar to the no-bake process, the character of the resin and the amount and type of catalyst employed are such that the core can be stripped from the core box in a matter of a few minutes.

There is a continuing need for a binder system which is suitable for use in all three of these processes by adding a suitable catalyst immediately before use. The kind and amount of catalyst employed will be such as to adapt the final binder-sand admixture to the intended purpose. That is, in the cold box process, the catalyst will typically be a gaseous amine, such as triethylamine or dimethylethylamine, dispersed in a suitable carrier such as carbon dioxide. In the no-bake and rapid no-bake processes, tertiary amine catalysts and conventional metal catalysts such as lead naphthenate, dibutyltin dilaurate and others of the same class, are employed in amounts adjusted to provide the desired set time.

SUMMARY OF THE INVENTION

It is an object of this invention to provide an improved foundry core mix.

It is another object of this invention to provide components of an improved sand core binder system.

Other objects will be apparent to those skilled in the art from the description herein.

The foundry core mix of this invention comprises foundry aggregate and about 0.5% to 5%, based upon the weight of the aggregate, of a binder comprising:
(a) a curable resin base of styrene-allyl alcohol copolymer or alkylene oxide adduct thereof,
(b) a liquid polyisocyanate reactive with the resin in the amount of about 50% to 150% by weight of the resin, and
(c) a catalyst for promoting the reaction between the curable resin base and the polyisocyanate resin when mixed therewith.

DETAILED DISCUSSION

The styrene-allyl alcohol copolymers useful in the practice of this invention are those containing from 1–40% by weight of allyl alcohol and having a number average molecular weight in the range of 500–5000. Suitable resins are commercially available from Monsanto Chemical Company. They are marketed as RJ 100 and RJ 101. RJ 101 is a preferred resin. It contains 26% allyl alcohol.

A preferred class of resins is obtained by reacting the styrene-allyl alcohol resin, e.g. RJ 101, with from 10 to 90% of an alkylene oxide in the presence of an alkaline catalyst, e.g. from 0.001% to 5.0%, preferably 0.1–1.0%, of an alkali metal hydroxide such as lithium, sodium or potassium hydroxide. Suitable alkylene oxides include ethylene oxide, propylene oxide, butylene oxide and trichlorobutylene oxide. Propylene oxide is a preferred alkylene oxide. A particularly preferred class of resins is obtained by mixing the styrene-allyl alcohol copolymer with an initiator such as a polyol, e.g. glycerol, trimethylolethane, trimethylolpropane, tris(hydroxymethyl)aminomethane and pentaerythritol, in an amount of 0–40% by weight, and/or an amine, such as ethylene diamine, propylene diamine, butylene diamine, hexamethylene diamine, etc. in amounts of 0–40% by weight of the total composition. Ethylene diamine is a preferred amine. Pentaerythritol is a preferred polyol. Tris(hydroxymethyl)aminomethane is an example of a combined polyol-amine.

The polyisocyanates which can be used in accordance with this invention are those known to be useful in the preparation of foundry core binders. Such polyisocyanates, which will hereinafter be called reactive polyisocyanates, include the aliphatic polyisocyanates such as hexamethylene diisocyanate, alicyclic polyisocyanates such as 4,4-dicyclohexylmethane diisocyanate and aromatic polyisocyanates such as 3,4- and 2,6-toluene diisocyanate, diphenylmethyl diisocyanate, and the dimethyl derivatives thereof. Other suitable polyisocyanates are 1,5-naphthalene diisocyanate, triphenylmethane triisocyanate, xylylene diisocyanate, and the methyl derivatives thereof, polymethylenepolyphenol isocyanates, and chlorophenylene-2,4-diisocyanate. Preferred, however, is the use of commercially available polyisocyanates which contain diphenylmethane diisocyanate, and triphenylmethane triisocyanate.

The binder composition is conventionally provided in two components or packages. One contains the resin base, the other the isocyanate. The polyisocyanate is employed in the amount of about 50% to 150% by weight of the resin. Usually the resin and polyisocyanate are employed in equal amounts by weight. In a preferred embodiment of the invention, both the isocyanate and the resin will be dissolved or dispersed in about 10–40% of a suitable solvent based on the weight of the binder. The amount and type of solvent in each package may vary provided the total amount of solvent present in the resin-isocyanate mixture is within the limits specified. Preferred are binder compositions in which the solvent is present in the amount of about 30% by weight of the binder.

Solvents which may be used to thin the resin base to provide a resin component are those which are conventionally used in foundry core processes such as aromatic hydrocarbon solvents, isophorone, cyclohexanone, and 2-(2-butoxyethoxy)-ethyl acetate.

In the preparation of cores suitable for foundry use, the binder (which comprises the resin, polyisocyanate, solvent and sometimes a catalyst) is employed in an amount in the range of 0.5% to 5% by weight of the foundry sand, and generally in the amount of about 0.5–1% by weight of the sand. The binder and sand are mixed in a muller or other device suitable for evenly distributing the binder on the sand. These processes are conventional and form no part of the instant invention.

As before described, a catalyst is generally employed and its selection is within the skill of those skilled in the art. Generally it will depend upon the specific process by which the core is made. Typical catalysts include amines, such as alkylene diamines, tertiary amines, such as triethylamine, and tributylamine and aromatic amines such as 4-phenyl-propyl-pyridine and N,N-dimethylbenzylamine. Preferred amines are tertiary amines having $pK_b$ values below 6. Also, metal catalysts such as lead naphthenate, dibutyltin dilaurate or stannous octoate, and similar types, are preferred. Generally the amount of catalyst should be within about 0.1% to 10% based on the combined weight of the resin plus isocyanate and about 2 to 3% is preferred, but the actual amount will vary somewhat depending on which amine is selected. This can be readily determined by one skilled in the art.

The catalysis of resin polyisocyanate binder systems in the foundry art is well known. The amount and type of catalyst is adapted to provide the desired speed of reaction in accordance with the parameters of the specified process in which the binder is employed.

The invention will be better understood with reference to the following examples. It is to be understood, however, that these examples are intended only to illustrate the invention, and it is not intended that the invention be limited thereby.

EXAMPLE 1

A styrene-allyl alcohol copolymer containing 26% by weight allyl alcohol (Resin RJ 101, having an equivalent weight of about 220 and a hydroxyl content of about 7.7% marketed by Monsanto Chemical Company), 240 g, was mixed with pentaerythritol, 110 g, and ethylene diamine, 40 g. This mixture was then reacted with propylene oxide, 610 g, in the presence of potassium hydroxide catalyst at a temperature of 150° C. under autogenous pressure. The resulting product, designated RF-6430, had a hydroxyl number of 357 and an equivalent weight of 158. The viscosity was about 15,000 cps. The resin actually used was obtained from Monsanto Chemical Co.

The resin so obtained was then dissolved in a 2:1 mixture of aromatic hydrocarbon and butoxyethyl acetate to provide a solution containing 70% by weight resin. The viscosity of the solution was E-F (Gardner-Holdt), about 130 cps, and the hydroxyl number was 226.

A portion of the resin solution, 24.5 g (17.15 g dry basis) was mixed with 0.7 g of a 25% solution of 4-phenyl-propyl pyridine in aromatic hydrocarbon solvent in a Hobart kitchen mixer for one minute at the No. 2 setting. Then there was added 3500 g of 99.9% pure silica sand having an AFS G fineness of 51.64. The sand temperature was 71°–72° F. and the relative humidity was 36–52%, and the mixer was operated for 30 seconds on the No. 2 setting. It was tossed, then mixed another 30 seconds. Polydiphenylmethane diisocyanate, Mondur MR made by Mobay Chemical Company, as a 70% by weight solution in aromatic hydrocarbon, was added (14 g wet basis, 9.8 g dry basis) and the mixer was operated another 30 seconds. The mixture was then packed into a mold to harden. Significant criteria are given in the table.

The foregoing experiment was repeated three additional times but using isocyanate at 14.7 g, 19.6 g, and 24.5 g (dry basis) respectively. The results are given in the table.

It was concluded that optimum results were obtained at 0.7% resin solution, based on sand, and 0.8% isocyanate solution, based on sand.

TABLE 1

| Run No. | 1 | 2 | 3 | 4 |
|---|---|---|---|---|
| Isocyanate, %[a] | 0.4 | 0.6 | 0.8 | 1.0 |
| Amine, %[b] | 0.65 | 0.55 | 0.48 | 0.42 |
| Bench life, min. | 15 | 15.5 | 16 | 19 |
| Strip time, min. | 26 | 28 | 35 | 40 |
| Plasticity time, min. | 10–11 | 10–11 | 10–11 | 10–11 |
| Surface and edges | Excellent | Excellent | Excellent | Excellent |
| Tensile strength, psi | | | | |
| 1.5 hours | 21 | 63 | 121 | 218 |
| Overnight | 88 | 152 | 294 | 374 |
| Scratch hardness | | | | |
| 1.5 hours | 80–82 | 90–92 | 93–94 | 92–93 |
| Overnight | 80–82 | 91–93 | 93–94 | 93–94 |
| Impact hardness | | | | |
| 1.5 hours | 3 | 21 | 55 | 66 |
| Overnight | 6 | 19–20 | 29 | 38 |

[a] By weight, based on sand, wet basis.
[b] By weight, dry basis, based on binder, of which 0.7% (0.49% dry basis) based on sand was resin and isocyanate as shown.

EXAMPLE 2

The experiment of Example 1 was repeated in all essential details except that the amounts of amine and isocyanate were varied. The results are summarized in Table 2.

TABLE 2

| Run No. | 1 | 2 | 3 |
|---|---|---|---|
| Isocyanate, %[a] | 0.8 | 1.0 | 0.8 |
| Amine, %[b] | 0.95 | 0.84 | 9.5 |
| Bench life, min. | 9 | 14 | 5 |
| Strip time, min. | 24 | 31 | 7–8 |
| Plasticity time, min. | 9 | 9–10 | 3–4 |
| Surface and edges | Excellent | Excellent | Excellent |
| Tensile strength, psi | | | |
| 1.5 hours | 156 | 245 | 139 |
| Overnight | 309 | 359 | 145 |
| Scratch hardness | | | |
| 1.5 hours | 92–93 | 93–94 | 92–93 |
| Overnight | 93–94 | 93–94 | 93–94 |
| Impact hardness | | | |
| 1.5 hours | 59 | 82 | 44 |
| Overnight | 23 | 36 | 19 |

[a] By weight, based on sand, wet basis.
[b] By weight, dry basis, based on binder, of which 0.7% (0.49% dry basis) based on sand was resin and isocyanate as shoiwn.

EXAMPLE 3

The experiment of Example 1 is repeated in all essential details except that ethylene oxide is substituted for propylene oxide. The ethoxylated styrene-allyl alcohol thereby obtained cures rapidly when mixed with isocyanate and amine catalyst.

EXAMPLE 4

The experiment of Example 1 is repeated in all essential details except that butylene oxide is substituted for propylene oxide. The ethoxylated styrene-allyl alcohol thereby obtained cures rapidly when mixed with isocyanate and amine catalyst.

EXAMPLE 5

The experiment of Example 1 is repeated in all essential details except that trichlorobutylene oxide is substituted for propylene oxide. The ethoxylated styrene-allyl alcohol thereby obtained cures rapidly when mixed with isocyanate and amine catalyst.

EXAMPLE 6

The experiment of Example 1 is repeated in all essential details except that trimethylolethane is substituted for pentaerythritol. The resin base thereby obtained cures rapidly when mixed with isocyanate and amine catalyst.

EXAMPLE 7

The experiment of Example 1 is repeated in all essential details except that trimethylolpropane is substituted for pentaerythritol. The resin base thereby obtained cures rapidly when mixed with isocyanate and amine catalyst.

EXAMPLE 8

The experiment of Example 1 is repeated in all essential details except that tris(hydroxymethyl)aminomethane is substituted for pentaerythritol. The resin base thereby obtained cures rapidly when mixed with isocyanate and amine catalyst.

EXAMPLE 9

A styrene-allyl alcohol copolymer having an equivalent weight of about 300 and a hydroxyl content of about 5.7% (RJ 100 marketed by Monsanto Chemical Company) 26.25 g (0.75% based on sand) was dissolved in 26.25 g of Mondur MR. This mixture was mixed with 3500 g of sand as described in Example 1. The sand and room temperature were each about 70° F. and the relative humidity was about 50%. Also included in the mix was 4-phenyl-propyl-pyridine in the amounts shown in the table. The sand-resin mixture was packed into a mold and the properties determined as shown in Table 3.

TABLE 3

| Run No. | 1 | 2 | 3[a] | 4[e] | 5[f] | 6[g] | 7[h] |
|---|---|---|---|---|---|---|---|
| Catalyst[d], g | 1.0 | 1.5 | 1.3 | — | 1.3 | 1.3 | 1.5 |
| Bench life, min. | 8 | 7.5 | 10 | 19–20 | 9–10 | 6–7 | 4–5 |
| Cure thru time, min. | 13 | 10–11 | 34 | 78 | 24 | 17 | 15–16 |
| Plasticity time, min. | 11 | 6 | 11–12 | 29 | 13 | 22 | 3–4 |
| Surface | Excellent | Excellent | Superior | Superior | Superior | Superior | Excellent |
| Edges | Excellent | Excellent | Superior | Excellent | Superior | Superior | Excellent |
| MHT[b] | 88 | 87–88 | 89–90 | 83–85 | 85–86 | 88 | 91–92 |
| NHB[c] | 89 | 88–89 | 89–90 | 81–83 | 86–87 | 86–88 | 91 |
| Tensile strength, psi | | | | | | | |
| 2 hours | 126 | 26 | 22 | 16 | 20 | 12 | 21 |
| Overnight | 132 | 107 | 287 | 136 | 272 | 247 | 62 |
| Scratch hardness | | | | | | | |
| 2 hours | 93 | 92–93 | 82–86 | 50–60 | 86–87 | 84–87 | 88 |
| Overnight | 93–94 | 92–93 | 87–92 | 74–80 | 87–89 | 86–92 | 94 |

[a]22.75 g of resin and 3.5 g of furfuryl alcohol was used.
[b]Mold hardness, top, Dietert. scale.
[c]Mold hardness bottom, Dietert. scale.
[d]4-Phenyl-propyl-pyridine.
[e]22.75 g of resin and 3.5 g of cyclohexanone.
[f]22.75 g of resin and 3.5 g of butoxyethanol.
[g]22.75 g of resin and 3.5 g of aromatic hydrocarbon solvent.
[h]33.25 g of resin and 17.5 g of 2590 were used.

EXAMPLE 10

The experiment of Example 9 was repeated in all essential details except that RJ 101 resin was substituted for RJ 100. The essential data are given in Table 4.

TABLE 4

| Run No. | 1 | 2 | 3 | 4 | 5 | 6 |
|---|---|---|---|---|---|---|
| Resin, g | 33.25 | 26.25 | 19.25 | 19.25 | 19.25 | 22.75 |
| Solvent, g | 19.25[a] | 26.25[a] | 33.25[a] | 33.95[b] | 29.75[c] | 29.75 |
| Catalyst, g | 1.5 | 1.5 | 1.5 | 1.5 | 1.5 | 1.5 |
| Bench life, min. | 8 | 8 | 18 | 10–11 | 8 | 12–13 |
| Cure thru time, min. | 13.5–14 | 19 | 120 | 90 | 16 | 46 |
| Plasticity time, min. | 3–4 | 7–8 | — | — | 40 | — |
| Surface | Excellent | Excellent | Excellent | Excellent | Excellent | Poor |
| Edges | Excellent | Excellent | Excellent | Excellent | Excellent | Poor |
| MHT | 91 | 90–91 | 86–87 | — | 89–90 | 86–90 |
| MHB | 91 | 90–91 | 86–87 | — | 88–90 | 85–87 |
| Tensile strength, psi | | | | | | |
| 2 hours | 34 | 22 | 18 | — | — | — |
| Overnight | 62 | 131 | 236 | 218 | 204 | 154 |
| Scratch hardness | | | | | | |
| 2 hours | 90–92 | 90–92 | — | — | — | — |
| Overnight | 90–92 | 92–93 | 94–95 | 88–92 | 93–95 | 90–92 |

[a]2590
[b]2590—26.25 g plus aromatic hydrocarbon 7.7 g.
[c]2590—26.25 g plus butyl cellosolve 3.5 g.
[d]2590—26.25 g plus aromatic hydrocarbon 3.5 g.

EXAMPLE 11

The experiment of Example 10 was repeated in all essential details except that the type of solvent was varied. The isocyanate used was Mondur MR, 80% by weight in butyl acetate. In each run, 35 g of isocyanate was used plus 0.6 g of 4-benzyl pyridine. The humidity was 46–49%. The data are given in Table 5.

This experiment showed that the use of ethyl acetate as the resin solvent gives inferior results and that the butyl acetate-butyl cellosolve mixture gives superior tensile strength.

Table 5

| Run No. | 1 | 2 | 3 | 4 |
|---|---|---|---|---|
| Resin, g | 35 | 35 | 35 | 35 |
| Solvent, g | 35 | 35 | 35 | 35 |
| Solvent | Butyl Acetate | Butyl Cellosolve | (a) | Ethyl Acetate |
| Bench life, min. | 5 | 7 | 6 | 3.4 |
| Cure thru time, min. | 13 | 23 | 19 | 23 |
| Plasticity, min. | 9 | 11 | 10 | 5 |
| Surface | Excellent | Excellent | Excellent | Fair |
| Edges | Excellent | Excellent | Excellent | Fair |
| Tensile strength, psi | | | | |
| 2 hours | 155 | 127 | 210 | 36 |
| Overnight | 108 | 217 | 350 | 97 |
| Scratch hardness | | | | |
| 2 hours | 93 | 92–93 | 93–94 | 55–60 |
| Overnight | 93–94 | 93–94 | 93–94 | 70–75 |

(a) Butyl acetate and butyl cellosolve in a 1:1 by weight ratio.

I claim:

1. A foundry core mix comprising a foundry aggregate and about 0.5% to 5% by weight of the aggregate of a binder comprising in admixture:
   (a) a curable resin gase of styrene-allyl alcohol copolymer or alkylene oxide adduct thereof, and
   (b) a reactive liquid polyisocyanate in the amount of 50–150% by weight of the resin base.

2. The foundry core mix of claim 1 wherein the resin base is a styrene-allyl alcohol copolymer containing about 1–40% by weight of allyl alcohol and has a number average molecular weight in the range of 500–5000.

3. The foundry core mix of claim 2 wherein the styrene-allyl alcohol copolymer contains from 1–26% by weight of allyl alcohol.

4. The foundry core mix of claim 2 wherein the styrene-allyl alcohol copolymer is dissolved in a solvent consisting of butyl acetate and butoxyethanol.

5. The foundry core mix of claim 1 wherein said resin base is an alkylene oxide adduct of the styrene-allyl alcohol copolymer.

6. The foundry core mix of claim 4 wherein said resin base is the ethylene oxide adduct of the styrene-allyl alcohol copolymer.

7. The foundry core mix of claim 5 wherein the resin base is the propylene oxide adduct of the styrene-allyl alcohol copolymer.

8. The foundry core mix of claim 5 wherein the resin base is the butylene oxide adduct of the styrene-allyl alcohol copolymer.

9. The foundry core mix of claim 5 wherein the resin base is the trichlorobutylene oxide adduct of the styrene-allyl alcohol copolymer.

10. The foundry core mix of claim 5 wherein the resin base is an alkylene oxide adduct of the styrene-allyl alcohol copolymer and the base additionally contains from 0–40% by weight of a polyol.

11. The foundry core mix of claim 5 wherein the resin base is an alkylene oxide adduct of the styrene-allyl alcohol copolymer and the base additionally contains from 0–40% by weight of a diamine.

12. The foundry core mix of claim 1 or 5 containing additionally a catalyst for promoting a reaction between the styrene-allyl alcohol copolymer or alkylene oxide adduct thereof and the polyisocyanate.

13. A binder system for a foundry aggregate comprising in admixture:
   (a) a curable resin base of styrene-allyl alcohol copolymer or alkylene oxide adduct thereof, and
   (b) a reactive liquid polyisocyanate in the amount of 50–150% by weight of the resin base.

UNITED STATES PATENT AND TRADEMARK OFFICE
CERTIFICATE OF CORRECTION

PATENT NO. : 4,144,215
DATED : March 13, 1979
INVENTOR(S) : Arek Khachaturian

It is certified that error appears in the above-identified patent and that said Letters Patent are hereby corrected as shown below:

Column 4, Table 2, Footnote b, "shoiwn" should read -- shown --

Column 7, line 26, "gase" should read -- base --

Signed and Sealed this

Sixteenth Day of October 1979

[SEAL]

Attest:

RUTH C. MASON
Attesting Officer

LUTRELLE F. PARKER
Acting Commissioner of Patents and Trademarks